United States Patent
Stickles et al.

(10) Patent No.: US 11,230,171 B2
(45) Date of Patent: Jan. 25, 2022

(54) DOOR APPARATUS

(71) Applicant: Bestop, Inc., Louisville, CO (US)

(72) Inventors: George C. Stickles, Thornton, CO (US); Frank A. Borke, Greeley, CO (US)

(73) Assignee: Bestop, Inc., Louisville, CO (US)

( * ) Notice: Subject to any disclaimer, the term of this patent is extended or adjusted under 35 U.S.C. 154(b) by 0 days.

(21) Appl. No.: 15/717,128

(22) Filed: Sep. 27, 2017

(65) Prior Publication Data

US 2018/0086184 A1 Mar. 29, 2018

Related U.S. Application Data

(60) Provisional application No. 62/400,406, filed on Sep. 27, 2016.

(51) Int. Cl.
*B60J 5/04* (2006.01)
*E06B 3/70* (2006.01)
*B60J 1/08* (2006.01)
*B60J 7/10* (2006.01)

(52) U.S. Cl.
CPC .......... *B60J 5/0486* (2013.01); *B60J 5/0463* (2013.01); *B60J 5/0468* (2013.01); *B60J 5/0476* (2013.01); *E06B 3/7009* (2013.01); *B60J 1/085* (2013.01); *B60J 7/106* (2013.01)

(58) Field of Classification Search
CPC ...... B60J 5/0486; B60J 5/0468; B60J 5/0476; B60J 5/0487; B60J 1/14; B60J 1/08; B60J 1/1815; B60J 7/106; B60J 1/085; Y10S 292/06

USPC .......... 49/464, 502; 296/148, 146.2
See application file for complete search history.

(56) References Cited

U.S. PATENT DOCUMENTS

| | | | | |
|---|---|---|---|---|
| 2,567,153 A | * | 9/1951 | Jackson | B60J 1/08 49/166 |
| 2,682,427 A | * | 6/1954 | Bright | B60J 5/0487 135/117 |
| 2,917,111 A | * | 12/1959 | Clarke | B60J 1/2011 160/369 |
| 3,722,935 A | * | 3/1973 | Latib | E05C 19/18 292/63 |
| 4,070,056 A | * | 1/1978 | Hickman | B60J 5/0487 296/148 |
| 4,644,699 A | * | 2/1987 | Chandler | B60J 5/0487 296/146.2 |
| 5,992,917 A | * | 11/1999 | Hilliard | B60J 1/1815 296/103 |
| 6,036,255 A | * | 3/2000 | Lester | B60J 5/0416 296/146.1 |
| 6,036,256 A | * | 3/2000 | Hilliard | B60J 1/08 160/182 |

(Continued)

*Primary Examiner* — Basil S Katcheves
*Assistant Examiner* — Omar F Hijaz
(74) *Attorney, Agent, or Firm* — Warn Partners, P.C.

(57) ABSTRACT

A multi-piece door assembly including a first door portion and a second door portion, which are removable to create a partially open-air experience or fully open-air experience. A pin pocket design is provided for selectively attaching the first door portion to a variety of different types of second door portions. A blow-out tab is provided to keep the multi-piece door assembly from blowing outwardly away from the vehicle with the increase of internal pressures at high speeds or crosswind situations.

18 Claims, 10 Drawing Sheets

(56) References Cited

U.S. PATENT DOCUMENTS

| | | | | |
|---|---|---|---|---|
| 6,073,989 A * | 6/2000 | Hilliard | ............... | B60J 1/1815 |
| | | | | 296/146.1 |
| 6,776,445 B1 * | 8/2004 | Conner | ................ | B60J 7/08 |
| | | | | 296/148 |
| 6,886,881 B1 * | 5/2005 | Henderson | ............. | B60J 1/08 |
| | | | | 296/146.2 |
| 6,988,759 B2 * | 1/2006 | Fin | ................ | B60J 5/0487 |
| | | | | 296/145 |
| 10,005,342 B1 * | 6/2018 | Oldani | ................ | B60J 1/085 |
| 2007/0261313 A1 * | 11/2007 | Ruppert | ............... | B60J 5/0406 |
| | | | | 49/502 |
| 2014/0265285 A1 * | 9/2014 | Erspamer | ............... | B60N 2/68 |
| | | | | 280/783 |
| 2017/0240030 A1 * | 8/2017 | Kato | ................ | B60J 5/0443 |

* cited by examiner

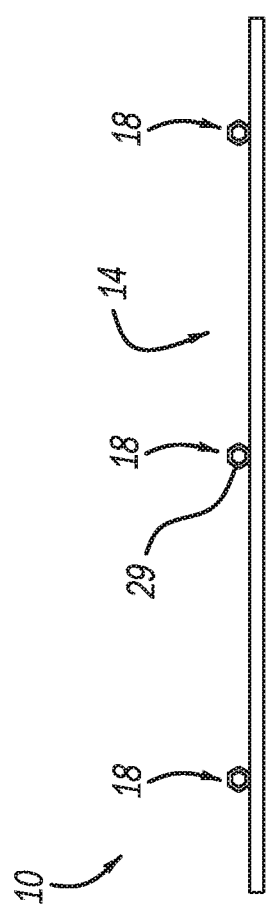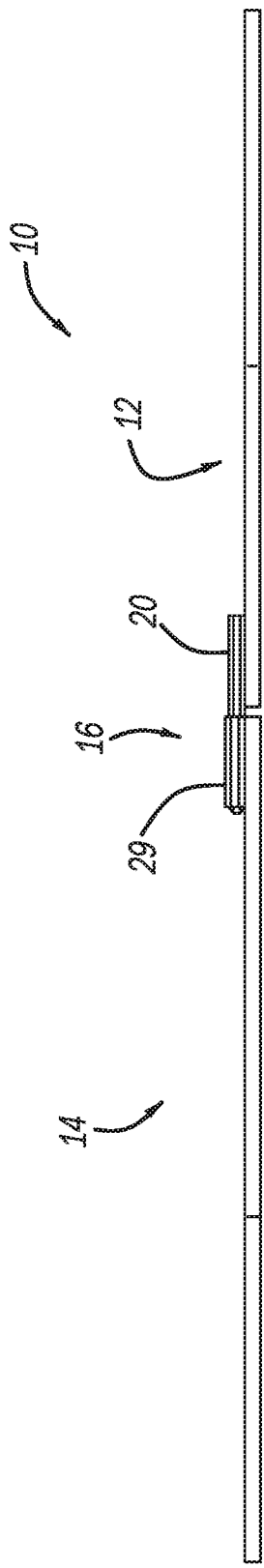

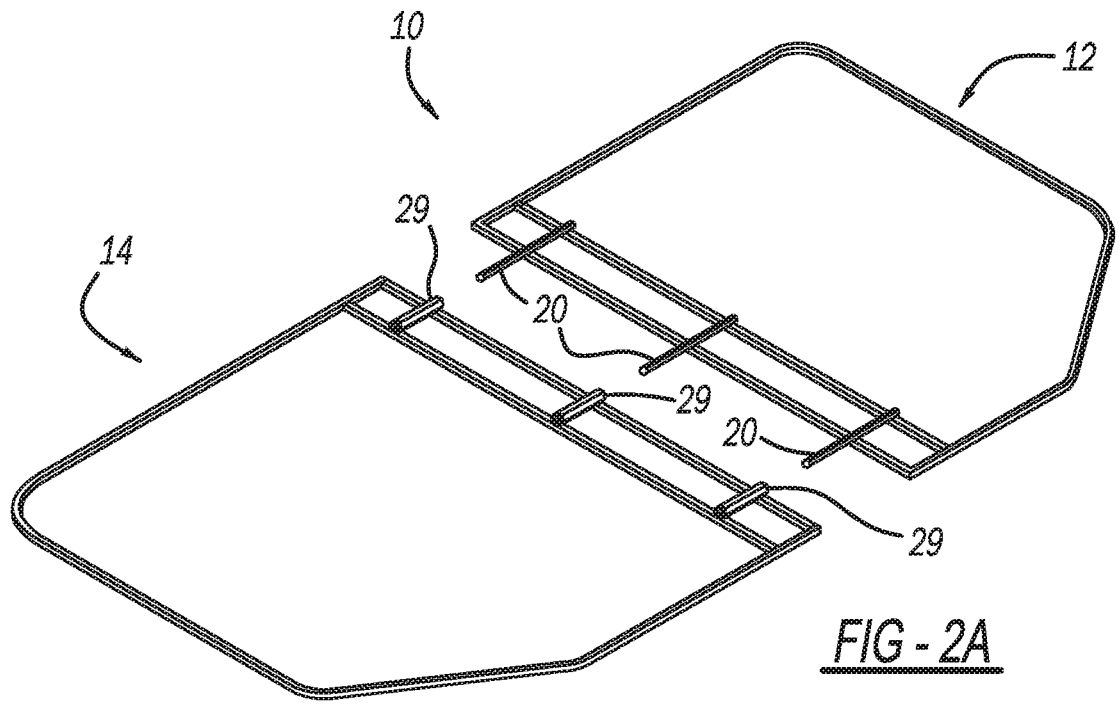
*FIG - 2A*
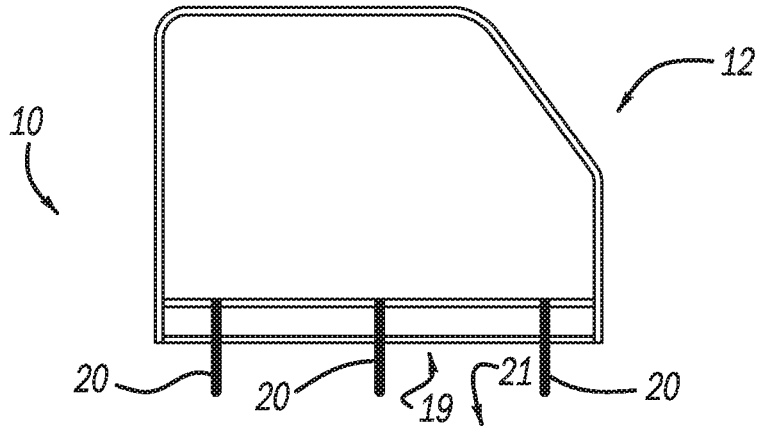
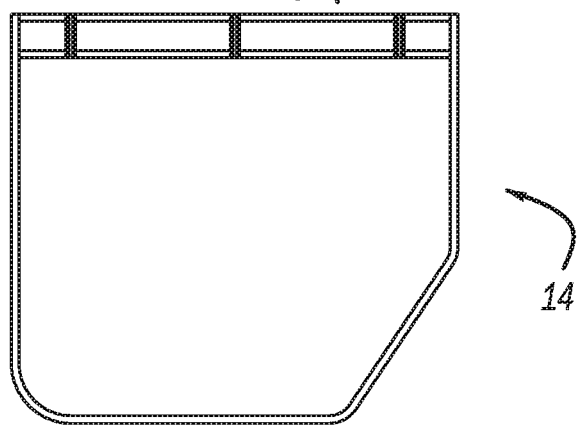
*FIG - 2B*

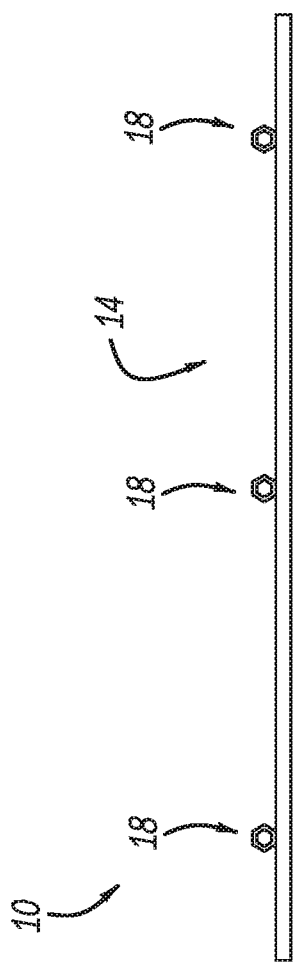
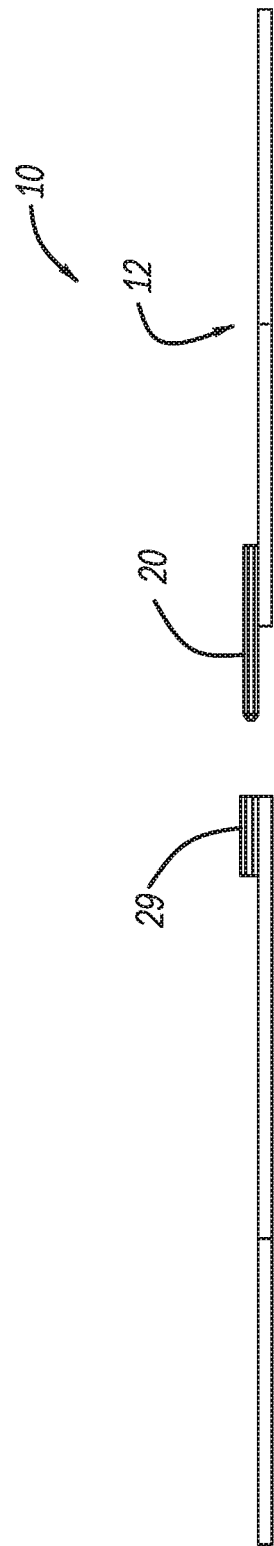

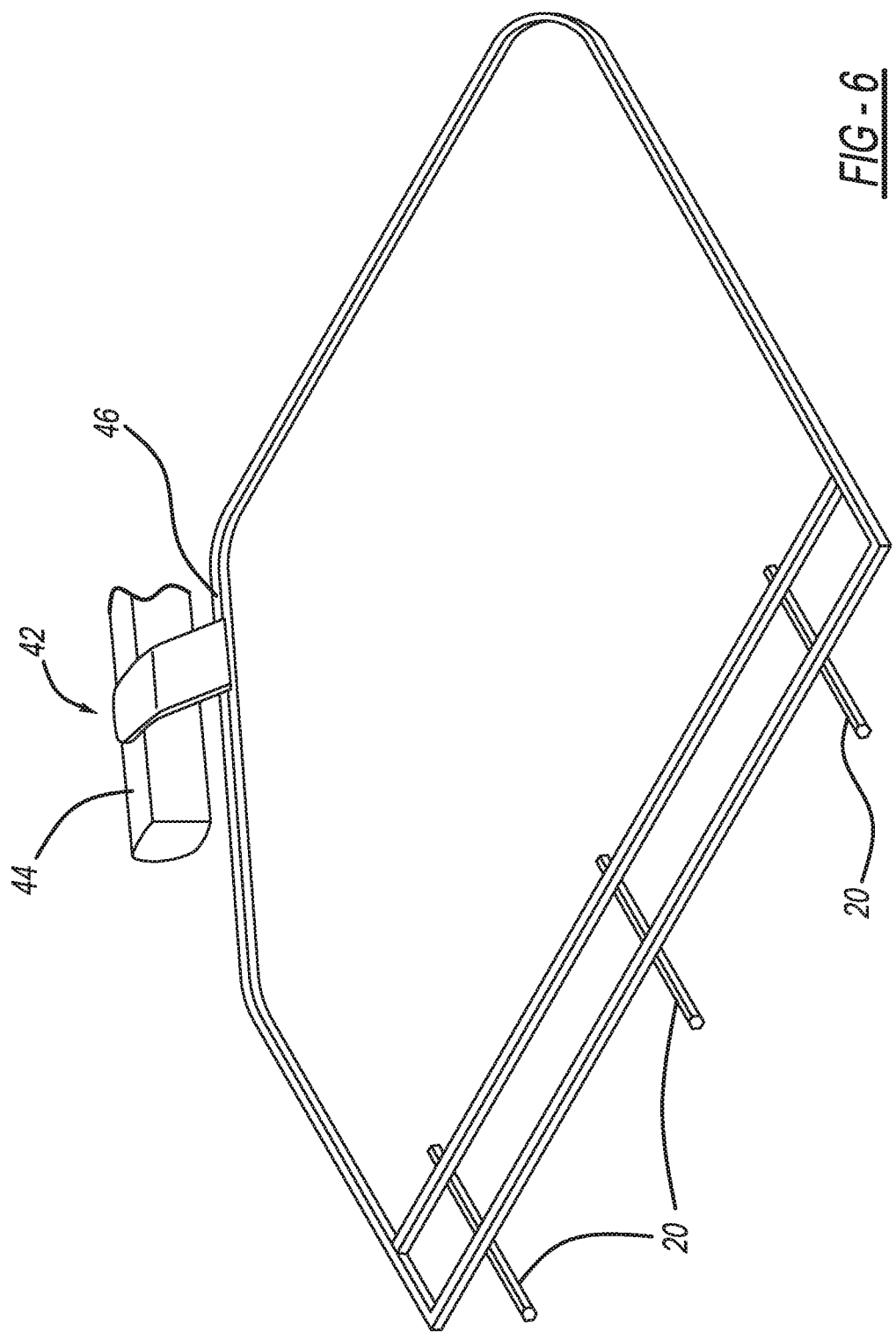

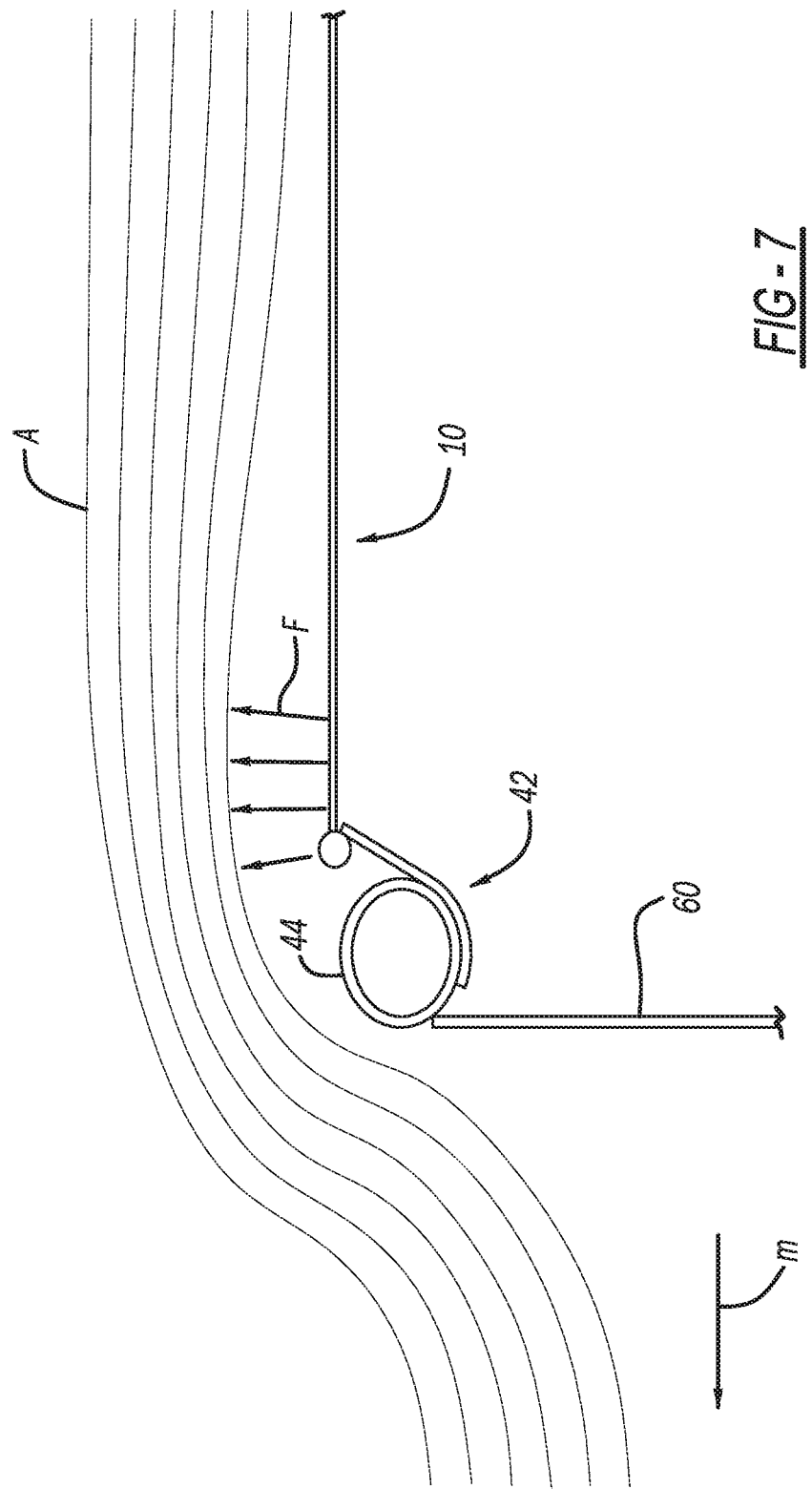

DOOR APPARATUS

CROSS REFERENCE TO RELATED APPLICATIONS

This application claims the benefit of U.S. Provisional Application No. 62/400,406, filed Sep. 27, 2016. The disclosures of the above application are incorporated herein by reference.

FIELD OF THE INVENTION

The present invention relates to door panels for UTVs, Jeeps, SUVs or any other vehicles. More particularly, the present invention relates to a multi-piece door which is at least partially removable for an open-air feel.

BACKGROUND OF THE INVENTION

A typical UTV lower half door assembly is known which requires a robust method of attaching an upper half door wire frame or composite cassette with sliding tempered or soft zip polyvinyl chloride (PVC) glass to complete the door enclosure. The enclosure needs to be robust enough to handle rollover protective structure(s) (ROPs) preload and internal pressure traveling at speeds of over 100 mph.

Typical vehicle doors are 1-piece and do not require the same fastening mechanism or design.

Therefore, there remains a need in the art for a door design that is multi-piece with a robust design and quick attachment features as well as incorporating a mechanism to prevent the door from pulling away from the ROP of the vehicle.

SUMMARY OF THE INVENTION

The present invention is directed to a two-piece door assembly for off-road vehicles, 4-door and 2-door sport utility vehicles (SUVs), Jeeps®, utility task vehicles (UTVs), or any other motor vehicle. There is provided a robust design to quickly attach a first door portion (such as an upper half door or "upper enclosure") to a second door portion (such as a lower half door or "lower enclosure"). This attachment system is utilized on many different lower door materials (and/or upper door materials same or different as lower) and designs, such as, but not limited to composite molded doors, cast alloy doors, thermoplastic materials, cassette, reinforced fiber composites, lightweight materials, tube construction doors, wire frame fabric doors, tube frame, wire frame, mesh, molded ABS, graphite sheet or the like, etc, and any combinations thereof. A "Blow Out Tab" is provided to keep doors from pulling away from any sport bar, ROPs member sealing surface, frame or other predetermined component surface(s), etc.

In a preferred embodiment according to the present invention, a 2-piece door is provided. Removing the first door portion (e.g., the upper half door removed) creates an open-air experience of the first door portion of the door.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1C is a bottom plan view of the two-piece door assembly according to the present invention;

FIG. 1D is a side elevation view of the two-piece door assembly according to the present invention;

FIGS. 2A-2D are exploded views of FIG. 1A-1D, respectively;

FIG. 6 is a perspective view of first door portion of the two-piece door assembly according to the present invention;

FIG. 7 is a schematic illustrating airflow pattern around the vehicle and vacuum generated by airflow, in accordance with the teachings of the present invention;

DETAILED DESCRIPTION OF THE PREFERRED EMBODIMENTS

The following description of the preferred embodiment(s) is merely exemplary in nature and is in no way intended to limit the invention, its application, or uses.

Referring to the figures generally, a two-piece door assembly of the present invention is shown generally at 10 including a first door portion shown generally at 12 (e.g., such as an "upper half door" or "first half portion" or "upper enclosure") and a second door portion shown generally at 14 (e.g., such as a "lower half door" or "second half portion" or "lower enclosure"). The first and second door portions 12,14 are connectable by an attachment system shown generally at 16. In a preferred embodiment, the attachment system 16 includes a plurality of attachment portions shown generally at 18 (e.g., typically two or more attachment portions, most preferably three attachment portions). Most preferably, the attachment portions 18 have a pin pocket design. In addition, the pin pocket design is a universal attachment arrangement, which allows for attaching first door portions 12 to a variety of second door portions 14 of various designs and materials.

Figure 1A:
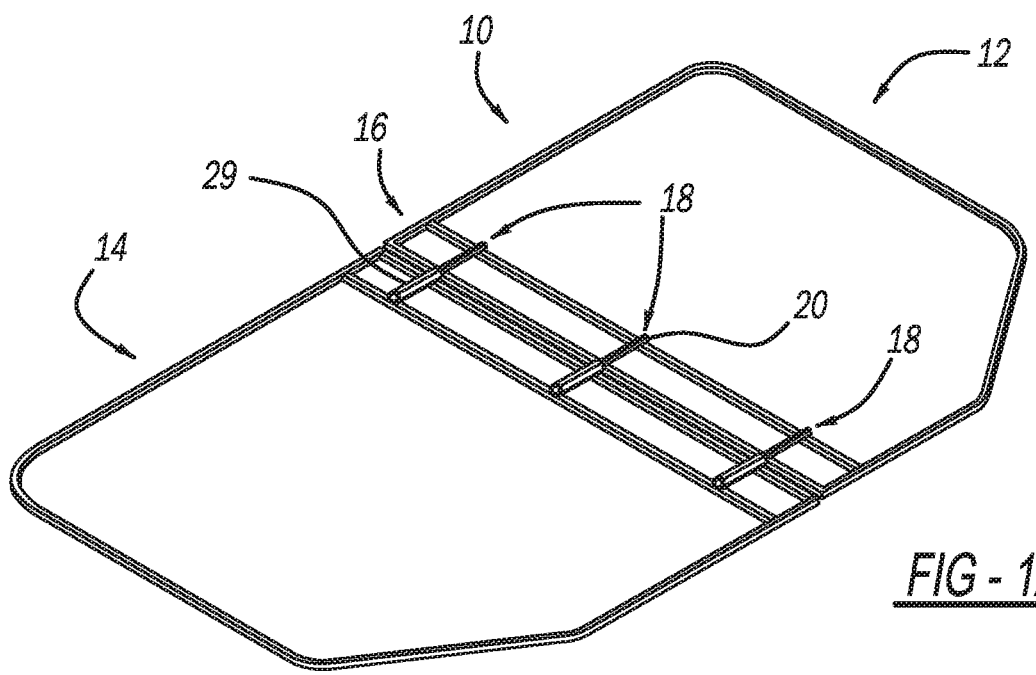
FIG. 1A is a perspective view of the two-piece door assembly according to the present invention.
Figure 1B:
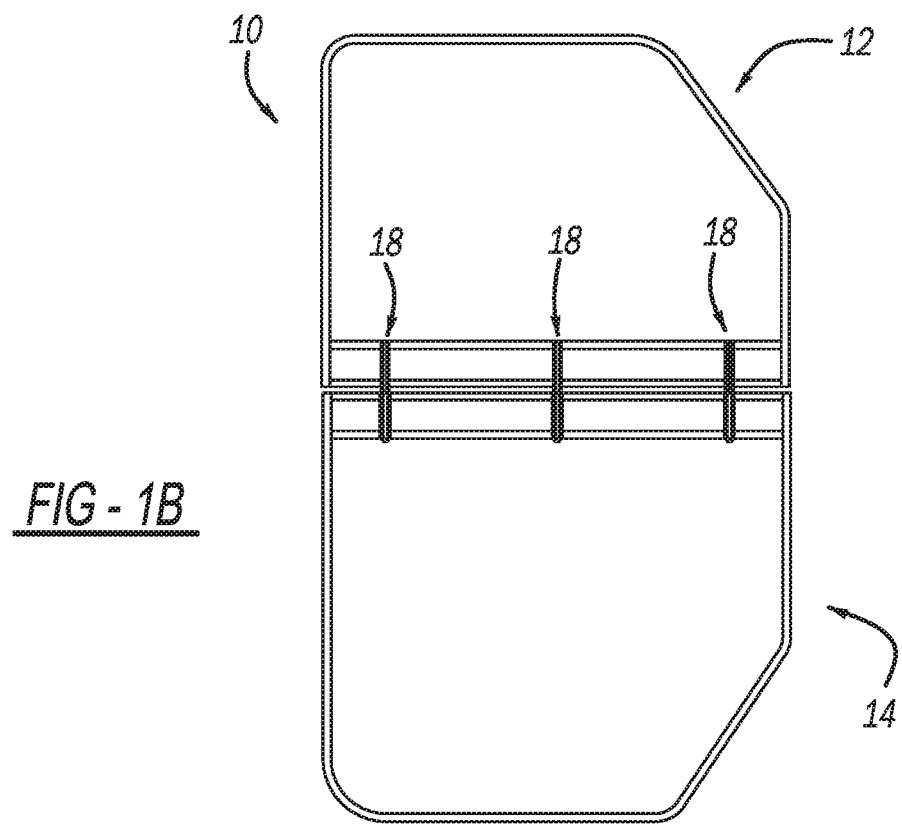
FIG. 1B is a front elevation view of the two-piece door assembly according to the present invention.
Figure 3:
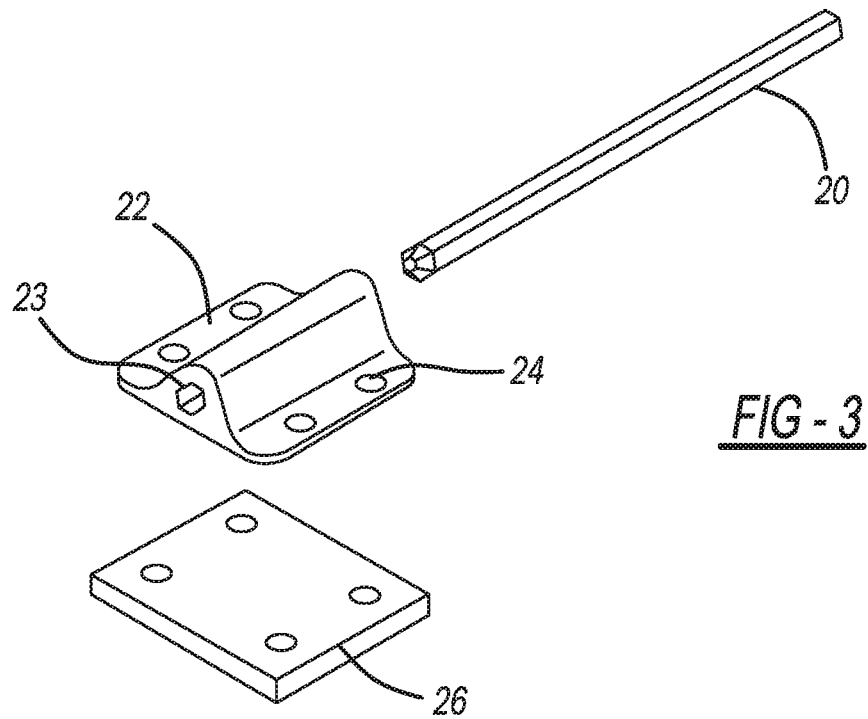
FIG. 3 is an exploded view of an attachment system, in accordance with one embodiment of the present invention.

According to one embodiment, referring generally to FIG. 3, each attachment portion 18 has at least one fastener member 20, preferably an upper half door pin which is a male portion of the pin pocket design. The fastener member 20 is connected to a first frame assembly (shown generally at 19 in FIG. 2B) include a first and second cross structural member. Each attachment portion 18 also has an attachment member 22, preferably a lower pin pocket which is a female portion of the pin pocket design. The attachment member 22 is connected to a first frame assembly (shown generally at 21 if FIG. 2B), include a first and second cross structural member. The upper pin 20 is mounted to the first door portion 12 and slidably connectable to the attachment member 22 via a pin pocket 23 or receiver portion which is an opening formed there through. The attachment member 22 is mounted on the second door portion 14. The attachment member 22 is typically molded or cast from metal or composite.

The attachment member 22 is connected to the second door portion 14 with a plurality of fasteners, e.g., screws, bolts, rivets, etc secured through a plurality of apertures 24 formed in the attachment member 22. Preferably, a mounting bracket 26 is sandwiched and held between the second door portion 14 and attachment member 22, e.g., by the plurality of fasteners or is an integrated feature of the second door portion 14, for mounting the attachment member 22 to the second door portion 14. A plurality of mounting brackets 26 are contemplated (one mounting bracket 26 for each attachment member 22), and, alternatively, the mounting bracket 26 is an elongated plate or a cross-bar or tubing on which the plurality of attachment members 22 are mounted (e.g., see FIGS. 2A and 5).

Figure 4:
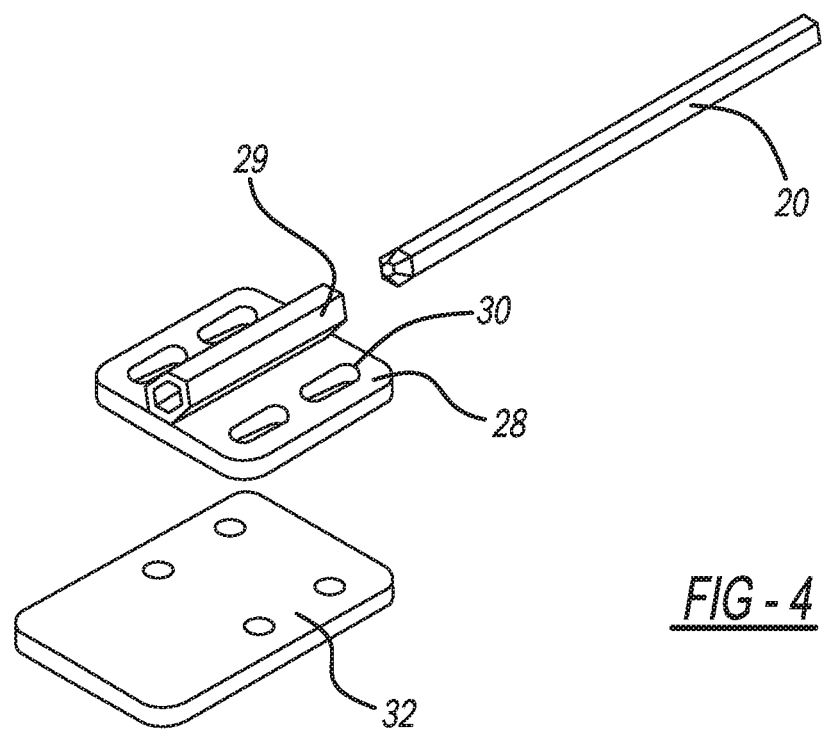
FIG. 4 is an exploded view of an attachment system, in accordance with another embodiment of the present invention.

According to another embodiment of the present invention referring generally to FIG. 4, the pin pocket design has a pin pocket 29 or receiver portion that is attached on a surface of an attachment member 28. Preferably, the attachment member 28 is a mounting plate. Each attachment portion 18 has an attachment member 28, preferably a lower pin pocket which is a female portion of the pin pocket design. The upper pin 20 is mounted to the first door portion 12 and slidably connectable to the attachment member 22 via the pin pocket 29. The attachment member 22 is mounted on the second door portion 14.

The attachment member 22 is connected to the second door portion 14 with a plurality of fasteners, e.g., screws, bolts, rivets, etc secured through a plurality of apertures 30 formed in the attachment member 22, which are preferably elongated apertures. Preferably, a mounting bracket 32 is sandwiched and held between the second door portion 14 and attachment member 28, e.g., by the plurality of fasteners or is an integrated feature of the second door portion 14, for mounting the attachment member 28 to the second door portion 14. A plurality of mounting brackets 32 are contemplated (one mounting bracket 32 for each attachment member 28), and, alternatively, the mounting bracket 32 is an elongated plate or cross-bar or tubing on which the plurality of mounting plates are mounted (e.g., see FIGS. 2A and 5).

Figure 5:
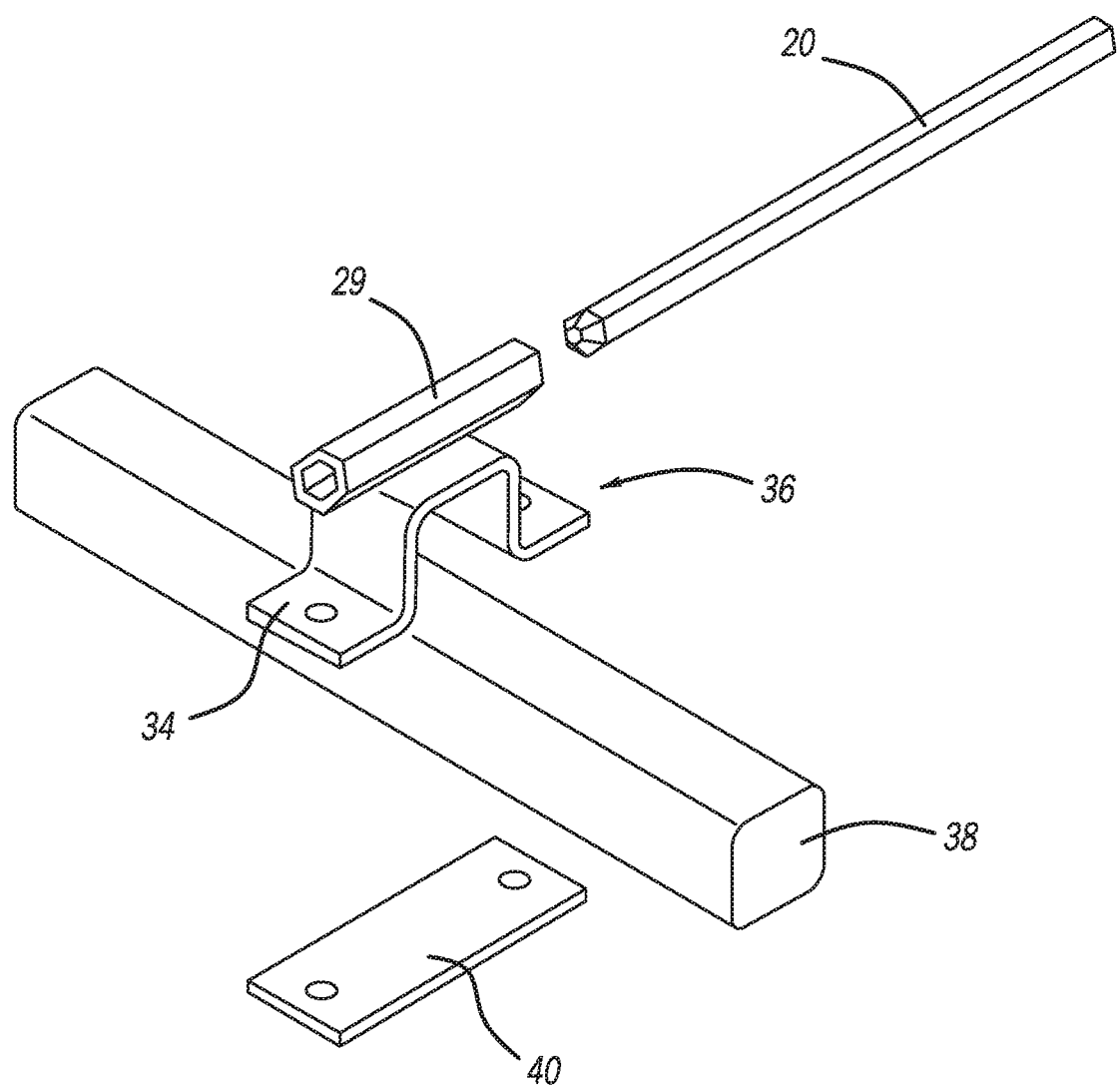
FIG. 5 is a clamp system according to the present invention.
Figure 8A:
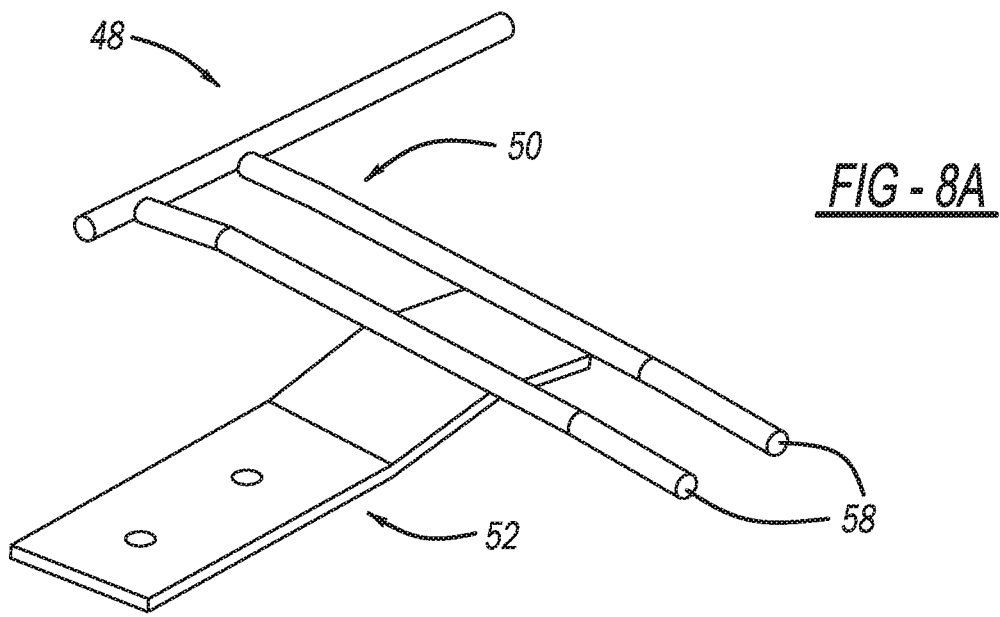
FIG. 8A is a perspective view of an upper frame assembly according to the present invention.
Figure 8B:
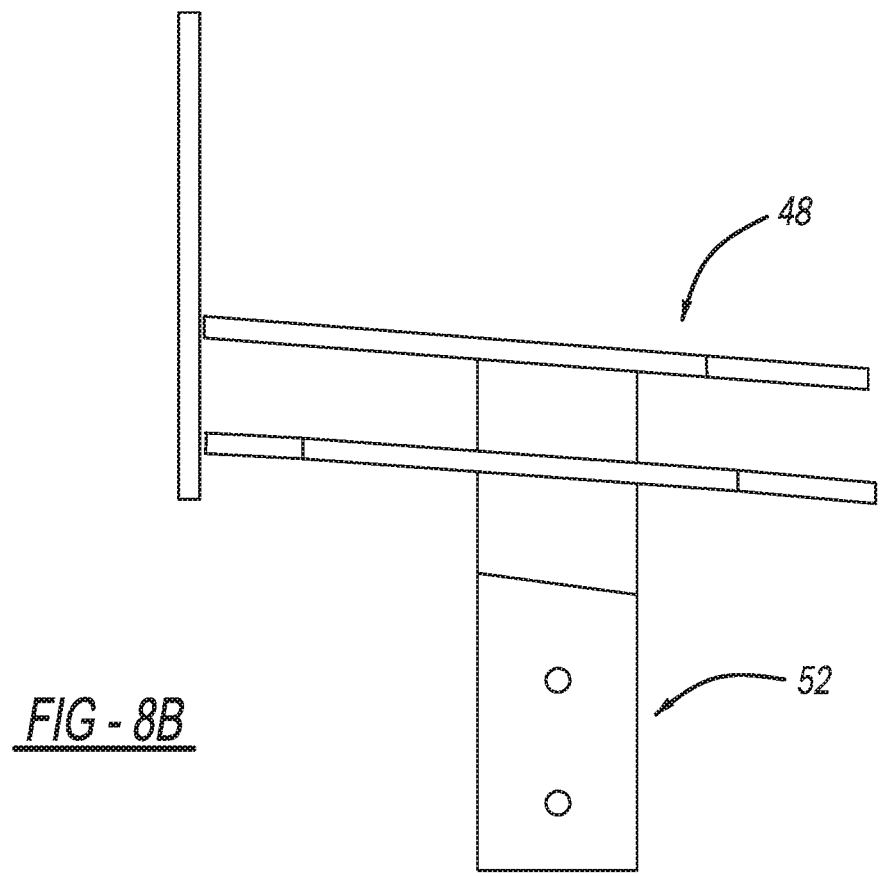
FIG. 8B is a front elevation view of the upper frame assembly according to the present invention.
Figure 8C:
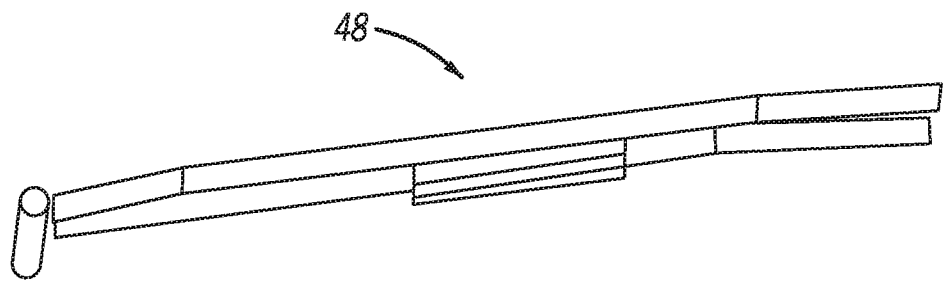
FIG. 8C is a bottom plan view of the upper frame assembly according to the present invention; and, FIG. 8D is a side elevation view of the upper frame assembly according to the present invention.
Figure 8D:
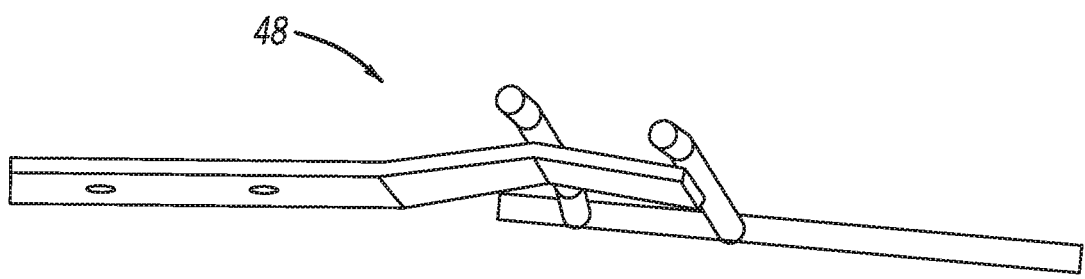

According to yet another embodiment of the present invention, referring generally to FIG. 5, the pin pocket design has a pin pocket 29 that is attached on a surface of an attachment member 34, however, the attachment member 34 is preferably a clamp. The pin pocket 29 is attached on a surface of the clamp 34 portion of a clamp bracket assembly shown generally at 36. The clamp 34 straddles a tubing section 38 of the clamp bracket assembly 36 and is mounted on the second door portion 14. Preferably, the clamp 34 straddles the tubing section 38 and is secured to a mounting bracket 40 and the second door portion 14 by a plurality of fasteners, e.g., screws, bolts, rivets, etc, extending through apertures formed in the clamp 34 and mounting bracket 40. A plurality of clamps 34 and mounting brackets 40 are contemplated attached to a respective at least one tubing section 40. The upper pin 20 is mounted to the first door portion 12 and slidably connectable to the attachment member 34 via the pin pocket 29.

Referring to FIGS. 3-5 generally, at least one attachment member is operably connected to one of the first or second door portions and at least one fastener member is operably connected to the other of the first or second door portions.

Other fastening mechanisms and arrangements suitable for connecting the first and second door portions 12,14 depending on the particular applications are contemplated without departure from the scope of the present invention.

The first and second door halves 12,14 can be selectively disconnected when desired and one or more of the door halves 12,14 can be removed for a partially open or open-air feel.

Referring generally to FIGS. 6-7, the two-piece door assembly 10 according to an aspect of the present invention is additionally provided with at least one tab portion shown generally at 42 or "blow-out tab" to engage a predetermined structure on the vehicle to trap the door frame keeping it from blowing out with the increase of internal pressures at higher speeds or crosswind situations or otherwise keep the door 10 from pulling away from the vehicle. Higher speeds are generally at least 30 mph, typically at least 50 mph, preferably at least 75 mph, most preferably over 100 mph. As the vehicle moves forward (as indicted generally by arrow "m"), an air flow pattern around the vehicle develops (as indicated generally by "A") and a vacuum is generated by airflow. Force pulls the doors 10 generally outward from the vehicle (as indicated generally by arrows "F"). ROPS 44 are depicted generally adjacent to the windshield 60 and door 10. ROPS 44 are illustrated in the figures and the tab 42 presses against the ROPS 44 when the direction of force pulling the doors is generally outward F. Thus, the tab portion 42 keeps the two-piece door assembly 10 from pulling away from the ROPS 44. Preferably, the tab portion 42 is attached to a frame, e.g., such as welded to the peripheral frame 46 of the first door portion 12. Alternative frames, areas of attachment, attachment to the second door portion 14, or attachment to the vehicle are contemplated without departing from the scope of the present invention. By way of example, the tab (or an additional tab) can be provided with the second door portion 14 for further door stability or use when the first door portion 12 is removed. In addition, alternatively, the tab is not fixed; but selectively moveable when desired, rotatable, etc. Additionally, the ROPS 44 is illustrative of a vehicle structure engaged by the tab 42, but is not intended to be limiting. Thus, the tab portion 42 is operably located and engages any suitable predetermined inner structure, ROPs, ROPs member sealing portion, sport bar and/or frame—thereby trapping the door 10 inside (or against the vehicle) to avoid blow out from a seal position.

Referring now to FIGS. 8A-8D, there is generally illustrated an exemplary door frame assembly shown generally at 48 including at least an upper frame shown generally at 50 and at least one bracket shown generally at 52. Preferably, the upper frame 50 has a generally vertical portion 56 and at least two generally horizontal portions 58 operably connected thereto, e.g., welded and/or by fasteners. Most preferably, the upper frame 50 is tubing, but any other frame is contemplated without departing from the scope of the present invention. The bracket 52 is connected, e.g., welded and/or by fasteners, to the upper frame 50 and operably assembled to the vehicle frame.

It is understood that the left side and right side doors are generally mirror-image.

It is understood that the door assembly may be any alternative multi-piece door assembly with at least one attachment system depending on the application without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A two-piece door assembly for a motor vehicle for inserting into an opening in the motor vehicle defined by a peripheral frame area, the two-piece door assembly comprising:
   a first door portion wherein at least the first door portion is removable from the motor vehicle to create a partially open-air experience;
   a second door portion connectable to the first door portion and including an outer peripheral edge developing a contact with a portion of the peripheral frame area of the motor vehicle;
   an attachment system including a plurality of attachment portions for connecting the first and second door portions together when desired;
   at least one unitary rotatable blow-out tab attached to the two-piece door assembly and having a first tab portion and a second tab portion, the first tab portion attached to the outer peripheral edge and extending beyond the outer peripheral edge and connected directly to the second tab portion, the second tab portion being shaped and adapted to press against in a non-latching configuration a motor vehicle structure of the peripheral frame area such that the at least one unitary blow-out tab rotates to engage the motor vehicle structure of the peripheral frame area of the motor vehicle to keep the two-piece door assembly from pulling away from the motor vehicle with increased internal pressures at higher speeds or crosswinds.

2. The two-piece door assembly of claim 1, wherein the vehicle is an off-road vehicle or utility task vehicle.

3. The two-piece door assembly of claim 1, wherein the plurality of attachment portions are pin pocket designs.

4. The two-piece door assembly of claim 3, wherein the plurality of attachment portions each include an attachment member operably connected to one of the first or second door portions and each include a fastener member operably connected to the other of the first or second door portion.

5. The two-piece door assembly of claim 4, wherein the fastener member is a pin which is received within the pin pocket design.

6. The two-piece door assembly of claim 5, wherein the attachment member is a pin pocket, and, the pin is received and held within the pin pocket.

7. The two-piece door assembly of claim 5, wherein the attachment member is a clamp that receives the pin and is operably connected to one of the first or second door portions.

8. The two-piece door assembly of claim 7, further comprising a tube section, wherein the clamp straddles the tube section to secure the tube section against the one of the first or second door portions.

9. The two-piece door assembly of claim 1, further comprising at least one mounting bracket operable to connect to one of the first or second door portions and to the plurality of attachment portions for connecting the plurality of attachment portions to one of the first or second door portions.

10. The two-piece door assembly of claim 1, wherein each of the at least one unitary blow-out tabs is welded to one of either of the first or second door portions.

11. The two-piece door assembly of claim 1, wherein the vehicle is a 4-door or 2-door sport utility vehicle.

12. The two-piece door assembly of claim 1, wherein the first and/or second door portions include a wire frame.

13. The two-piece door assembly of claim 12, wherein the at least one unitary blow-out tab is welded to the wire frame of the first or second door portions to keep the door assembly from blowing outwardly under higher speeds or crosswinds.

14. The two-piece door assembly of claim 1, further comprising a door frame including an upper frame with at least one bracket, wherein said bracket is operably connected to a vehicle frame.

15. A multi-piece door assembly for a motor vehicle for inserting into an opening in the motor vehicle defined by a peripheral frame area, said multi-piece door assembly, comprising
   a first door half having a plurality of fastener members, wherein at least an upper door portion is removable from the motor vehicle to create a partially open-air experience;
   a second door half having a plurality of cooperating attachment members selectively coupled to the plurality of fastener members, wherein said second door half is selectively removable from the motor vehicle when desired; and,
   at least one unitary rotatable blow-out tab attached to the multi-piece door assembly and having a first tab portion and a second tab portion, the first tab portion attached to the outer peripheral edge and extending beyond the outer peripheral edge and connected to the second tab portion, the second tab portion being shaped and adapted to press against in a non-latching configuration a motor vehicle structure of the peripheral frame area such that the at least one unitary blow-out tab when rotated engages the motor vehicle structure of the motor vehicle to keep the multi-piece door assembly from pulling away from the motor vehicle with increased internal pressures at higher speeds or crosswinds.

16. The multi-piece door assembly of claim 15, wherein the plurality of attachment members are pin pockets that receive a respective pin.

17. The multi-piece door assembly of claim 16, further comprising a plurality of mounting brackets operably coupled to the plurality of attachment members, respectively, said plurality of mounting brackets operably connected to a second frame assembly of the first door half.

18. A multi-piece door assembly for a motor vehicle for inserting into an opening in the motor vehicle defined by a peripheral frame area, said multi-piece door assembly comprising
   an upper door portion having a plurality of fastener members, wherein at least the upper door portion is removable from the motor vehicle to create a partially open-air experience;
   a lower door portion having a plurality of mounting plates operably connected to a plurality of receiving members, respectively, wherein each of said plurality of fastener members are selectively slidably received within a respective one of said plurality of receiving members to connect said upper and lower door portions together, wherein said lower door portion includes an outer peripheral edge developing a contact with a portion of the peripheral frame area of the motor vehicle;
   at least one unitary rotatable blow-out tab operably connected to said upper door portion and, having a first tab portion and a second tab portion, the first tab portion attached to the outer peripheral edge and extending beyond the outer peripheral edge and integral with the second tab portion, the second tab portion being shaped and adapted to press against in a non-latching configuration a motor vehicle structure of the peripheral frame area such that when rotated in a motor vehicle installed position the at least one unitary blow-out tab is immediately adjacent a rollover protective structure of said motor vehicle, and prevents the multi-piece door assembly from pulling outward from the motor vehicle caused by vacuum generated by airflow.

\* \* \* \* \*